United States Patent
Vu et al.

(10) Patent No.: US 12,412,126 B2
(45) Date of Patent: Sep. 9, 2025

(54) DATA AUGMENTATION AND BATCH BALANCING METHODS TO ENHANCE NEGATION AND FAIRNESS

(71) Applicant: Oracle International Corporation, Redwood Shores, CA (US)

(72) Inventors: Duy Vu, Melbourne (AU); Varsha Kuppur Rajendra, Bellevue, WA (US); Dai Hoang Tran, Sydney (AU); Shivashankar Subramanian, Melbourne (AU); Poorya Zaremoodi, Melbourne (AU); Thanh Long Duong, Seabrook (AU); Mark Edward Johnson, Castle Cove (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 272 days.

(21) Appl. No.: 17/984,743

(22) Filed: Nov. 10, 2022

(65) Prior Publication Data
US 2023/0153528 A1    May 18, 2023

Related U.S. Application Data

(60) Provisional application No. 63/278,828, filed on Nov. 12, 2021.

(51) Int. Cl.
*G06F 40/20* (2020.01)
*G06F 40/166* (2020.01)
(Continued)

(52) U.S. Cl.
CPC .......... *G06N 20/00* (2019.01); *G06F 40/166* (2020.01); *G06F 40/20* (2020.01); *G06F 40/279* (2020.01); *G06F 40/49* (2020.01); *G06N 5/022* (2013.01)

(58) Field of Classification Search
USPC ................................................ 704/8–10, 257
See application file for complete search history.

(56) References Cited

U.S. PATENT DOCUMENTS

2016/0189037 A1    6/2016   Pereg et al.
2020/0167418 A1    5/2020   He
(Continued)

OTHER PUBLICATIONS

Badjatiya et al., "Stereotypical Bias Removal for Hate Speech Detection Task Using Knowledge-Based Generalizations", In The World Wide Web Conference, May 13-17, 2019, 11 pages.
(Continued)

*Primary Examiner* — Leonard Saint-Cyr
(74) *Attorney, Agent, or Firm* — Kilpatrick Townsend & Stockton LLP

(57) ABSTRACT

Techniques for augmentation and batch balancing of training data to enhance negation and fairness of a machine learning model. In one particular aspect, a method is provided that includes generating a list of demographic words associated with a demographic group, searching an unlabeled corpus of text to identify unlabeled examples in a target domain comprising at least one demographic word from the list of demographic words, rewriting the unlabeled examples to create one or more versions of each of the unlabeled examples and generate a fairness invariance data set, and training the machine learning model using unlabeled examples from the fairness invariance data set.

14 Claims, 9 Drawing Sheets

(51) Int. Cl.
*G06F 40/279* (2020.01)
*G06F 40/49* (2020.01)
*G06N 5/022* (2023.01)
*G06N 20/00* (2019.01)

(56) References Cited

U.S. PATENT DOCUMENTS

| | | |
|---|---|---|
| 2021/0034913 A1 | 2/2021 | Pan et al. |
| 2021/0149995 A1 | 5/2021 | Misra et al. |
| 2021/0232915 A1 | 7/2021 | Dalli et al. |
| 2021/0248268 A1 | 8/2021 | Ardhanari et al. |
| 2021/0333983 A1 | 10/2021 | Singh et al. |
| 2022/0129644 A1* | 4/2022 | Kang ................ G06F 18/2193 |
| 2022/0164600 A1* | 5/2022 | Cheng ............. G06V 30/19147 |
| 2022/0198136 A1* | 6/2022 | Peleg .................... G06F 40/253 |
| 2022/0358282 A1* | 11/2022 | Hegelich ................ G06F 40/30 |
| 2024/0212811 A1* | 6/2024 | Vogler ................ G06V 10/803 |

OTHER PUBLICATIONS

Kaushik et al., "Learning the Difference that Makes a Difference with Counterfactually-Augmented Data", International Conference on Learning Representations, Available Online at: https://arxiv.org/pdf/1909.12434.pdf, Feb. 14, 2020, pp. 1-17.

Ribeiro et al., "Beyond Accuracy: Behavioral Testing of NLP Models with CheckList", Available Online at: https://arxiv.org/pdf/2005.04118.pdf, May 8, 2020, 11 pages.

U.S. Appl. No. 17/984,768, Non-Final Office Action mailed on Jul. 16, 2025, 13 pages.

U.S. Appl. No. 17/984,717, Non-Final Office Action mailed on Aug. 1, 2025, 15 pages.

\* cited by examiner

DATA AUGMENTATION AND BATCH BALANCING METHODS TO ENHANCE NEGATION AND FAIRNESS

CROSS-REFERENCE TO RELATED APPLICATIONS

The present application is a non-provisional application of and claims the benefit and priority under 35 U.S.C. 119(e) of U.S. Provisional Application No. 63/278,828, filed Nov. 12, 2021, the entire contents of which is incorporated herein by reference for all purposes.

FIELD

The present disclosure relates generally to artificial intelligence techniques, and more particularly, to techniques for augmentation and batch balancing of training data to enhance negation and fairness of a machine learning model.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

However, artificial intelligence-based solutions, such as chatbots, can be difficult to build because many automated solutions require specific knowledge in certain fields and the application of certain techniques that may be solely within the capabilities of specialized developers. To illustrate, as part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions. For example, to train the ML technique(s) or model(s), precise training data is required to enable the algorithms to understand and learn certain patterns or features (e.g., for chatbots-intent extraction and careful syntactic analysis, not just raw language processing) that the ML technique(s) or model(s) will use to predict the outcome desired (e.g., inference of an intent from an utterance). In order to ensure the ML technique(s) or model(s) learn these patterns and features properly, the developer may be responsible for selecting, enriching, and optimizing sets of training data for the ML technique(s) or model(s).

BRIEF SUMMARY

Techniques disclosed herein relate generally to artificial intelligence techniques. More specifically and without limitation, techniques disclosed herein relate to techniques for augmentation and batch balancing of training data to enhance negation and fairness handling capabilities of a machine learning model. A machine learning model can classify user text into different classes, such as predefined sentiment that users are expressing in the text. When the training data used to train the machine learning model is not adequate, the machine learning model may incorrectly predict the sentiment class of the input text more frequently. Techniques disclosed herein provide data augmentation and batch balancing techniques to enhance the training of the machine learning model in sentence sentiment analysis, such that the machine learning model is more resilient towards negation and fairness handling, and more accurately learns the pattern or boundary of various sentiment classes.

In various embodiments, a computer-implemented method is provided that includes: obtaining an original labeled data set for training a machine learning model to classify sentiment, where each example from the original labeled data set is labeled with at least a sentiment classification; searching the original labeled data set, an unlabeled corpus of text, or both to identify examples comprising negation cues, sentiment laden words, words with sentiment prefixes or suffixes, or a combination thereof; rewriting the labeled examples from the original labeled data set, examples from the unlabeled corpus of text, or both to create a labeled version of each example that is contradictory to an original sentiment classification and generate a negation pair data set comprising example pairs, where each example pair comprises a labeled example and a labeled contradictory form of the labeled example, and where the rewriting comprises: substituting or adding a negation cue to the labeled example, replacing a sentiment laden word of the labeled example with an antonym of the sentiment laden word, or adding a sentiment prefix or suffix to the labeled example; and training the machine learning model using the example pairs from the negation pair data set.

In some embodiments, the training comprises: batching the labeled examples from the original labeled data set and the negation pair data set into batches; evaluating, using a first objective function, performance of the machine learning model on the labeled examples in each batch; and updating, using an optimization function, model parameters of the machine learning model based on the evaluating of the performance of the machine learning model.

In some embodiments, the batching comprises: grouping the labeled examples into data groups based on sentiment class, data source, or a combination thereof, the data source being the original labeled data set or the negation pair data set; and sampling labeled examples for each of the batches from the data groups. Each of the data groups is assigned a sampling weight based on the sentiment class, the data source, or a combination thereof; and the first objective function is modified by the sampling weight during the evaluating of the performance of the machine learning model.

In some embodiments, the sampling the labeled examples comprises selection of the labeled example and the labeled contradictory form of the labeled example such that each of the example pairs is maintained together within a given batch.

In some embodiments, the computer-implemented method further includes obtaining a fairness invariance data set comprising groups of unlabeled examples. Each group of unlabeled examples comprises multiple versions K of each unlabeled example, and a single unlabeled original example is from the unlabeled corpus of text while a remainder of K−1 unlabeled examples are different from the unlabeled original example by only a demographic word. The batching further comprises grouping the unlabeled examples into data groups based on sentiment class, data source, or a combination thereof, the data source being the fairness invariance data set; and sampling unlabeled examples for each of the batches from the data groups. The evaluating comprises evaluating, using the first objective function, a second objective function, or a combination thereof, the performance of the machine learning model on the labeled examples and the unlabeled examples in each batch.

In some embodiments, the sampling the unlabeled examples comprises selection of the single unlabeled original example and the remainder of K−1 unlabeled examples in a group of unlabeled examples such that the unlabeled examples of a group are maintained together within a given batch.

In some embodiments, the first objective function is cross-entropy loss and the second objective function is Kullback-Leibler divergence.

In various embodiments, a computer-implemented method is provided that includes: generating a list of demographic words associated with a demographic group; searching an unlabeled corpus of text to identify unlabeled examples in a target domain comprising at least one demographic word from the list of demographic words; rewriting the unlabeled examples to create one or more versions of each of the unlabeled examples and generate a fairness invariance data set, where each version of an unlabeled example includes a demographic word that is different from an original demographic word in the unlabeled example, and where the one or more versions of each of the unlabeled examples are created by substituting the original demographic word with a demographic word from the list of demographics words or a subset thereof that is associated with the demographic group from which the original demographic word belongs; and training the machine learning model using unlabeled examples from the fairness invariance data set.

In some embodiments, the training comprises: batching the unlabeled examples from the fairness invariance data set into batches; evaluating, using a first objective function, performance of the machine learning model on the unlabeled examples in each batch; and updating, using an optimization function, model parameters of the machine learning model based on the evaluating of the performance of the machine learning model.

In some embodiments, the batching comprises: grouping the unlabeled examples into data groups based on sentiment class, data source, or a combination thereof, the data source being the fairness invariance data set; and sampling unlabeled examples for each of the batches from the data groups. Each of the data groups is assigned a sampling weight based on the sentiment class, the data source, or a combination thereof. The first objective function is modified by the sampling weight during the evaluating of the performance of the machine learning model.

In some embodiments, the one or more versions of each of the unlabeled examples are multiple versions, and the multiple versions of each of the unlabeled examples and the unlabeled examples are maintained in groups; each group comprises an unlabeled original example from the unlabeled corpus of text and the multiple versions thereof that are different from the unlabeled original example by a demographic word; and the sampling the unlabeled examples comprises selection of the unlabeled original example and the multiple versions thereof such that each group of unlabeled examples is maintained together within a given batch.

In some embodiments, the computer-implemented method further includes obtaining a negation pair data set comprising pairs of labeled examples. The batching further comprises: grouping the labeled examples into data groups based on sentiment class, data source, or a combination thereof, the data source being the negation pair data set; and sampling labeled examples for each of the batches from the data groups. The evaluating further comprises evaluating, using the first objective function, a second objective function, or a combination thereof, the performance of the machine learning model on the labeled examples and the unlabeled examples in each batch.

In some embodiments, each pair of labeled examples comprises a labeled example and a labeled contradictory form thereof, and the sampling the labeled examples comprises selection of the labeled example and the labeled contradictory form thereof such that each pair of labeled examples is maintained together within a given batch.

In some embodiments, the first objective function is Kullback-Leibler divergence and the second objective function is cross-entropy loss.

In various embodiments, a system is provided that includes one or more data processors and a non-transitory computer readable storage medium containing instructions which, when executed on the one or more data processors, cause the one or more data processors to perform part or all of one or more methods disclosed herein.

In various embodiments, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
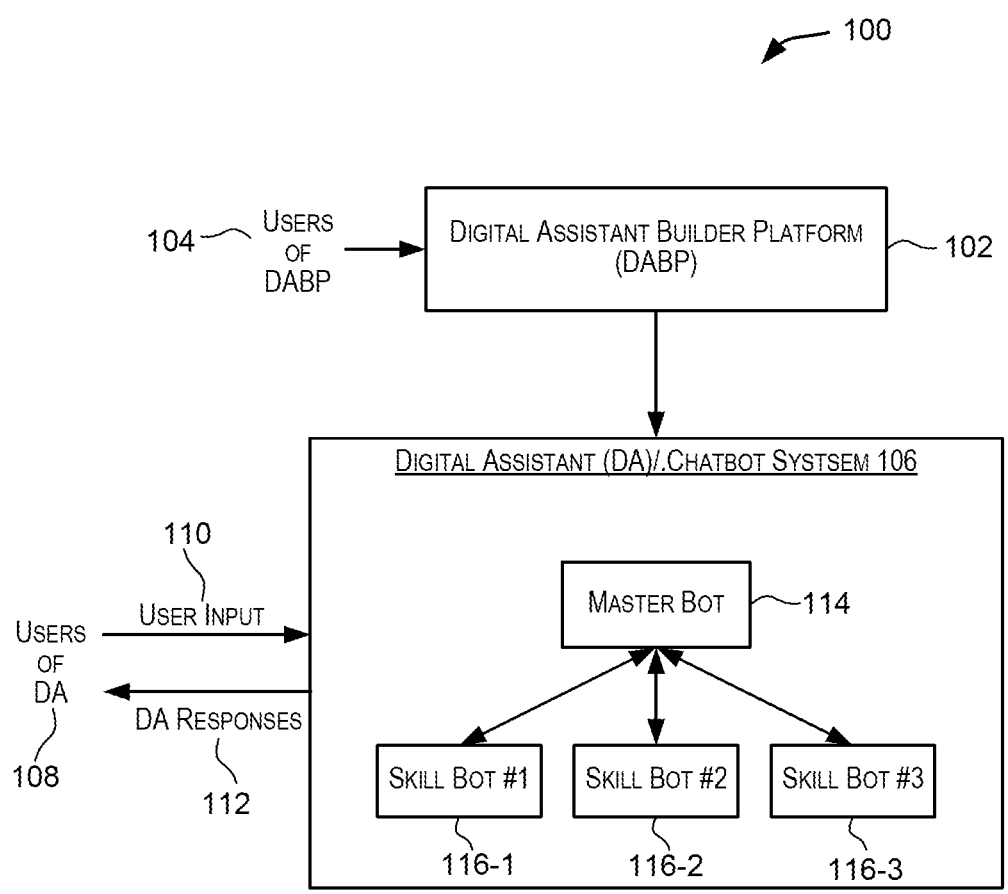
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Artificial intelligence has many applications. For example, a digital assistant is an artificial intelligence-driven interface that helps users accomplish a variety of tasks using natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow artificial intelligence-based technology such as a chatbot to understand what the user wants the chatbot to do. Intents are the user's intention communicated to the chatbot via user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

In addition to deciphering the intent of users efficiently, artificial intelligence-based technology can be configured to decode the mood of users instantly and drive the flow of conversations in tune with customer's emotions. Sentiment analysis is one such technique that makes artificial intelligence-based technology such as chatbots even more powerful in terms of understanding the emotion in the user's utterances and can be used to provide a more customized support experience for the user. Sentiment analysis is a subfield of machine learning (ML) and natural language processing (NLP) that can help artificial intelligence-based technology determine emotions from textual or voice data. It's one of the basic techniques used by artificial intelligence-based technology to analyze customer data by mining thoughts, opinions, or sentiments. The use of conversational sentiment analysis enables an artificial intelligence-based technology such as a chatbot to understand the mood of a user by sentence structures and verbal cues. The artificial intelligence-based technology can use sentiment analysis to modify responses in tune with customer's emotions and thus help segment the audience.

However, building a machine learning model that can determine the end user's sentiment based upon user utterances, is a challenging task in part due to the subtleties and ambiguity of natural languages and the dimension of the input space (e.g., possible user utterances and emotions expressed within utterances) and the size of the output space (type of sentiment such as positive, negative, mixed, neutral, and the like). An illustrative example of this difficulty arises from characteristics of natural language, such as negation handling (a sentiment analysis model is expected to correctly predict sentiment in the presence of various negation forms). In linguistics, negation is a way of reversing the polarity of words, phrases, and even sentences. For example, an utterance "I like this product" should be classified as positive; whereas the negated sentence "I don't like this product" should be classified as negative. However, there is no fixed size for the scope of affected words. For example, in the sentence "The show was not interesting," the scope is only the next word after the negation word. But for sentences like "I do not call this film a comedy movie," the effect of the negation word "not" is until the end of the sentence. The original meaning of the words changes if a positive or negative word falls inside the scope of negation—in that case, opposite polarity will be returned. The simplest approach for dealing with negation in a sentence, which is used in most conventional sentiment analysis techniques, is marking as negated all the words from a negation cue to the next punctuation token. The effectiveness of the negation model can be changed because of the specific construction of language in different contexts. Nonetheless, this approach has limited effectiveness and requires the cost and time intensive exercise of marking/labeling the words of each negation sentence in a data set.

Another challenge with determining the end user's sentiment, is the ability of the sentiment analysis models to classify sentiment while imparting fairness in the determination (the sentiment analysis model is expected to give invariant or fair predictions in the presence of words from difference demographic groups). Artificial intelligence-based technology such as chatbots are beneficial to society but as they improve in predictive performance, comparable to human capabilities, they could perpetuate inappropriate human biases. In the context of sentiment analysis, these biases may come in many forms. For instance, sentiment analysis models may consider the messages conveyed by a specific gender or race to be less positive simply because of their race and gender. Therefore, even when it is not clear how biases are manifested, it is advantageous for the developer of artificial intelligence-based technology to address this problem. Conventional approaches attempt to counter these biases by manipulating the training data (e.g., removing bias inducing training examples from a corpus of training data). Nonetheless, these approaches have limited effectiveness and require the cost and time intensive exercise of identifying bias with respect to technical characteristics of models and manually manipulating a training data set to impart invariance in the technical characteristics of models.

Accordingly, different approaches are needed to address these challenges and others. In order for a sentiment analysis model to predict the sentiment of an input utterance when negation is present and/or with fairness, the approaches described herein attempt to make the prediction model learn negation and/or fairness by augmenting the training data with labeled and unlabeled examples. The labels for these examples will be for the correct sentiment or ground truth such as positive, negative, mixed, or neutral. Consequently, the sentiment analysis model will better generalize, learn that negations affect the sentiment orientation of other words in an utterance, and avoid bias from factoring into the decision-making process.

In an exemplary embodiment, a computer-implemented method is provided that includes: obtaining an original labeled data set for training a machine learning model to classify sentiment, where each example from the original labeled data set is labeled with at least a sentiment classification; searching the original labeled data set, an unlabeled corpus of text, or both to identify examples comprising negation cues, sentiment laden words, words with sentiment prefixes or suffixes, or a combination thereof; rewriting the labeled examples from the original labeled data set, examples from the unlabeled corpus of text, or both to create a labeled version of each example that is contradictory to an original sentiment classification and generate a negation pair data set comprising example pairs, where each example pair comprises a labeled example and a labeled contradictory form of the labeled example, and where the rewriting comprises: substituting or adding a negation cue to the labeled example, replacing a sentiment laden word of the labeled example with an antonym of the sentiment laden word, or adding a sentiment prefix or suffix to the labeled example; and training the machine learning model using the example pairs from the negation pair data set.

In another exemplary embodiment, a computer-implemented method is provided that includes: generating a list of demographic words associated with a demographic group; searching an unlabeled corpus of text to identify unlabeled examples in a target domain comprising at least one demographic word from the list of demographic words; rewriting the unlabeled examples to create one or more versions of each of the unlabeled examples and generate a fairness invariance data set, where each version of an unlabeled example includes a demographic word that is different from an original demographic word in the unlabeled example, and where the one or more versions of each of the unlabeled examples are created by substituting the original demographic word with a demographic word from the list of demographics words or a subset thereof that is associated with the demographic group from which the original demographic word belongs; and training the machine learning model using unlabeled examples from the fairness invariance data set.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
 (1) Configuring settings for a new skill bot
 (2) Configuring one or more intents for the skill bot
 (3) Configuring one or more entities for one or more intents
 (4) Training the skill bot
 (5) Creating a dialog flow for the skill bot
 (6) Adding custom components to the skill bot as needed
 (7) Testing and deploying the skill bot
 Each of the above steps is briefly described below.
 (1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot-DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
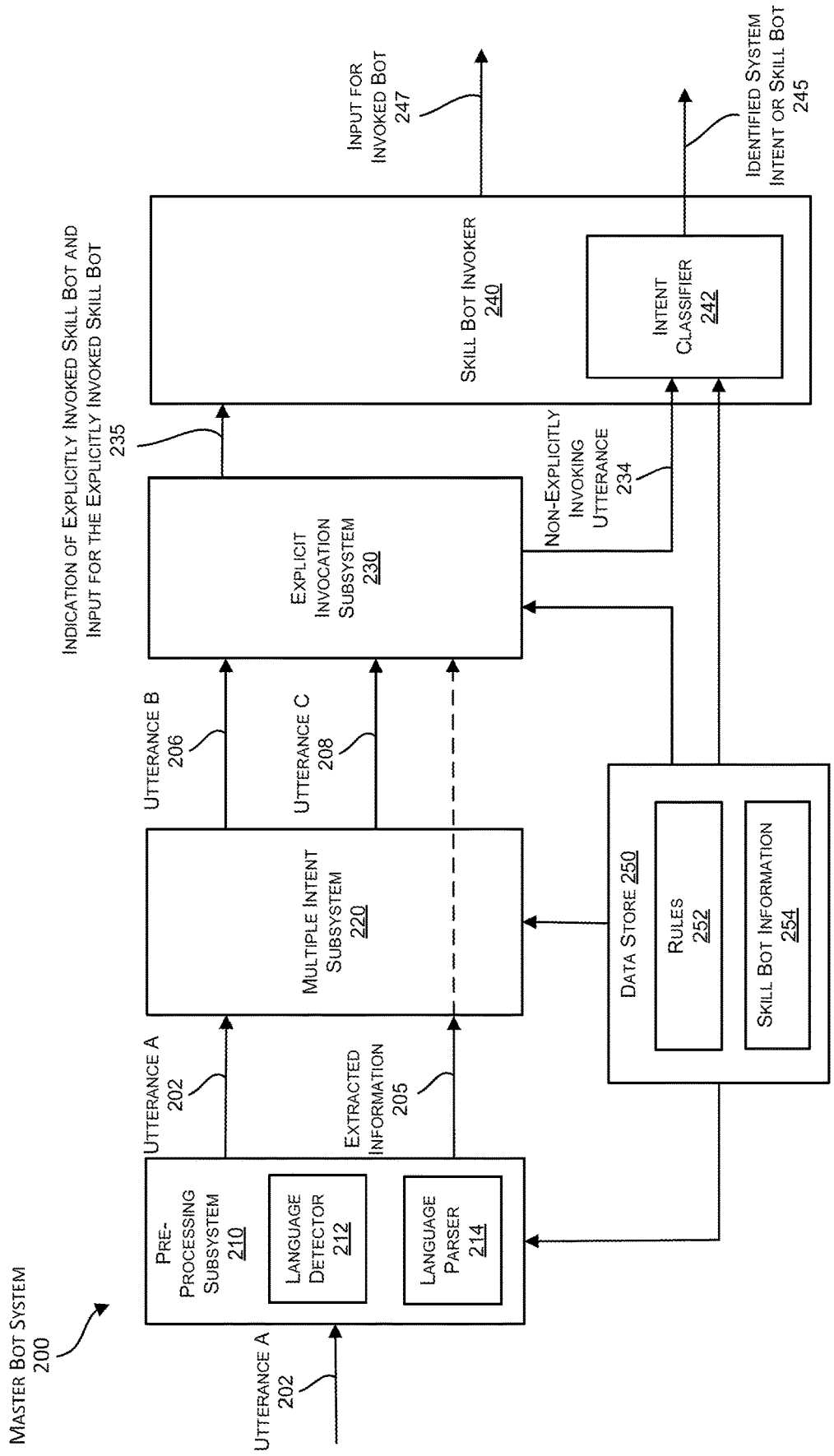
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
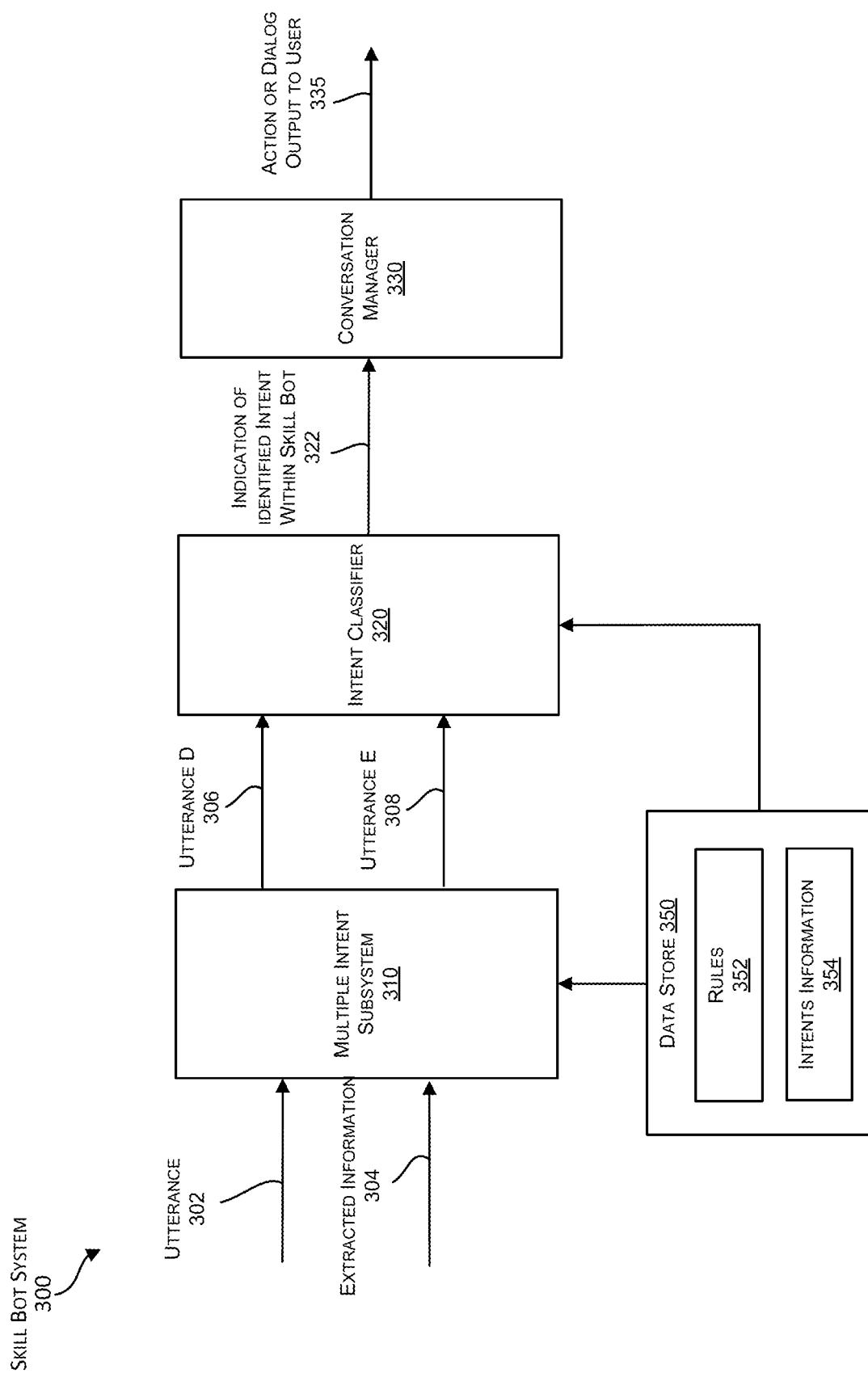
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine learning model) can be stored as part of skill bot information 254.

In certain embodiments, the intent classifier 242 is implemented using a machine learning model, as described in further detail herein. Training of the machine learning model may involve inputting at least a subset of utterances from the example utterances associated with various skill bots to generate, as an output of the machine learning model, inferences as to which bot is the correct bot for handling any particular training utterance. For each training utterance, an indication of the correct bot to use for the training utterance may be provided as ground truth information. The behavior of the machine learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine learning model FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine learning model. The machine learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents.

If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Data Augmentation and Batch Balancing to Enhance Negation and Fairness Handling Capabilities It has been discovered that machine learning models used for analyzing sentiment can have difficulty in identifying and handling negation terms in utterances and are susceptible to various biases. In order to overcome these problems and others, various embodiments are directed to techniques for implementing data augmentation and batch balancing to enhance the negation and fairness handling capabilities of machine learning models. By augmenting the training data with additional labeled and unlabeled examples particularly developed for learning negation, maintaining fairness, or a combination thereof, the machine learning models become better at focusing on the most important parts of the examples in the correct context that tie them to their classes. Advantageously, the machine learning models trained using the techniques described herein perform better on sentiment analysis of utterances in various context because the models are better able to focus on the important part of the utterances in the correct context while maintaining fairness. Moreover, because the augmentation and batch balancing are applied automatically in a synthetic agnostic manner, the user (e.g., customer) does not need to be concerned about manually adding labeled and unlabeled examples in various contexts for the training data.

In some embodiments, the machine learning models trained using augmented training data and/or the batch balancing techniques described herein are implemented in a chatbot system, as described with respect to FIGS. 1, 2 and 3. Nonetheless, while the augmentation and batch balancing techniques are described in various instances herein with particular reference to sentiment analysis and/or a chatbot system, it should be understood that these techniques are applicable for other types of machine learning tasks and/or artificial-intelligence based systems where a developer/user is interested in enhancing negation and fairness handling.

Figure 4:
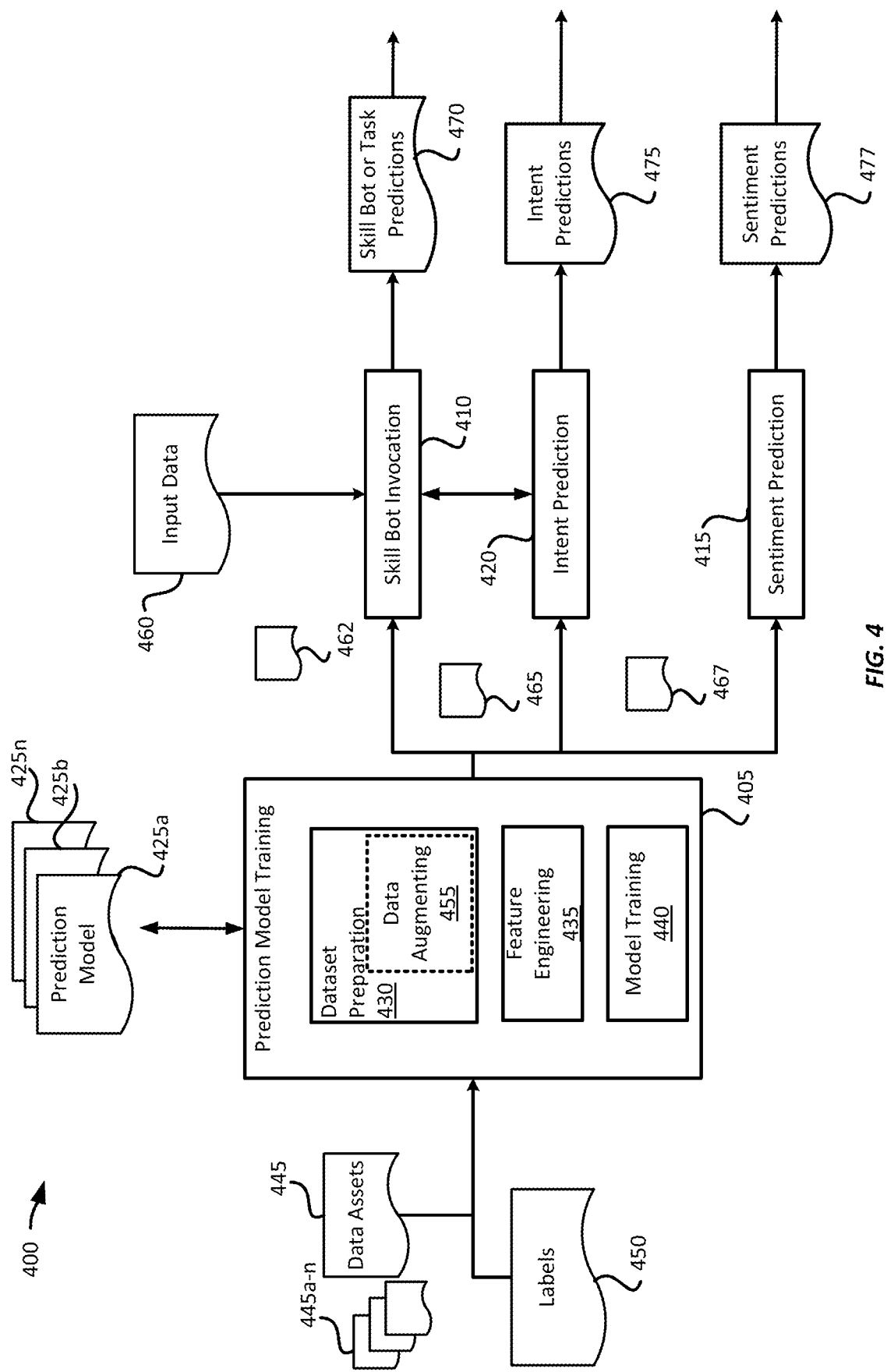
FIG. 4 is a simplified block diagram of a model training and deployment system in accordance with various embodiments.

FIG. 4 shows a block diagram illustrating aspects of a model system 400 configured to for training and deploying machine learning models (e.g., a sentiment classifier or intent classifier 242 or 320 described with respect to FIGS. 2 and 3). The model system 400 in this example includes various stages: a training stage 405 to train machine learning models, a skill bot invocation stage 410 to determine a likelihood that text (e.g., an utterance) is representative of a task that a particular skill bot is configured to perform, a sentiment prediction stage 415 to classify text with a sentiment, and an intent prediction stage 420 to classify text as expressing one or more intents. The training stage 405 builds and trains one or more machine learning models 425*a*-425*n* ('n' represents any natural number) to be used by the other stages (which may be referred to herein individually as a model 425 or collectively as the models 425). For example, the models 425 can include a model for determining a likelihood that an utterance is representative of a task that a particular skill bot is configured to perform, another model for predicting a sentiment from an utterance, another model for predicting an intent from an utterance for a first type of skill bot, and another model for predicting an intent from an utterance for a second type of skill bot. Still other types of prediction models may be implemented in other examples according to this disclosure.

A model 425 may be a deep learning model, such as a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A model 425 can also be any other suitable machine learning model trained for natural language processing, understanding, or generating, such as a Naive Bayes Classifier, Linear Classifier, Support Vector Machine, Bagging Models such as Random Forest Model, Boosting Models, Shallow Neural Networks, a Transformer such as Bidirectional Encoder Representations from Transformers (BERT), or combinations of one or more of such techniques—e.g., CNN-HMM or MCNN (Multi-Scale Convolutional Neural Network). The model system 400 may employ the same type of model or different types of models for determining a likelihood of a task that a particular skill bot is configured to perform, sentiment analysis and predicting a sentiment for an utterance, predicting an intent from an utterance for a first type of skill bot, and predicting an intent from an utterance for a second type of skill bot. Still other types of models may be implemented in other examples according to this disclosure.

To train the various models 425, the training stage 405 is comprised of three main subsystems or services: dataset preparation 430, feature engineering 435, and model training 440. The dataset preparation 430 facilitates the process of loading data assets 445, splitting the data assets 445 into training and validation sets 445 a-n so that the system can train and test the models 425, and performing basic natural language pre-processing (e.g., tokenizing utterances). The data assets 445 may include at least a subset of utterances from example utterances. In some instances, the example utterances are associated with various domains or skill bots (e.g., travel or an airline ticketing skill). As indicated above, an utterance can be provided in various ways including audio or text. The utterance can be a sentence fragment, a complete sentence, multiple sentences, and the like. For example, if the utterance is provided as audio, the data preparation 430 may convert the audio to text using a speech-to-text converter (not shown) that inserts punctuation marks into the resulting text, e.g., commas, semicolons, periods, etc. In some instances, the example utterances are provided by a client or customer. In other instances, the example utterances are automatically generated from libraries of utterances (e.g., identifying utterances from a library that are specific to a skill that a chatbot is to learn). The data assets 445 for a model 425 can include input text or audio (or input features of text or audio frames) and labels 450 corresponding to the input text or audio (or input features) as a matrix or table of values. For example, for each training utterance, an indication of the correct bot to use for the training utterance may be provided as ground truth information for labels 450. The behavior of the model 425 can then be adapted (e.g., through back-propagation) to minimize the difference between the generated inferences and the ground truth information. Alternatively, a model 425 may be trained for a particular skill bot, using at least a subset of example utterances associated with that particular skill bot as training utterances. The ground truth information for labels 450 for each training utterance may be a sentiment class or a particular bot intent class associated with the training utterance.

A. Data Augmenting

In various embodiments, the data preparation 430 includes an augmenting subsystem or service 455 for augmenting the data assets 445 to include utterances in various contexts which facilitate a model (e.g., model 425) learning patterns and classes in the presence of various negation forms and/or while being more resilient towards biases. By augmenting the data assets 445 with utterances having negations in various contexts, the model becomes better at focusing on the most important parts of the examples and context that tie them to their classes. The augmenting subsystem or service 455 is implemented using augmentation and batching techniques as follows for incorporating utterances in various contexts with the original utterances of the data assets 445.

The augmentation and batching techniques disclosed herein may be used to generate a model that can predict the sentiment class of input data (e.g., input data 460 such as text or utterance from a user). Sentiment may be classified as one of several classes, including: positive, negative, neutral, and mixed, as shown in Table 1.

TABLE 1

| Sentiment | Definition |
| --- | --- |
| Positive | All or some aspects of the text express a positive opinion, attitude, or mood. There is no aspect that is negative. |
| Negative | All or some aspects of the text express a negative opinion, attitude, or mood. There is no aspect that is positive. |
| Mixed | Some aspects of the text express a positive opinion, attitude, or mood, while other aspects express a negative opinion, attitude or mood. |
| Neutral | Either no opinion is expressed (the text is purely informative), or when an opinion is expressed, it is neutral (neither positive nor negative). |

In order to accurately predict the sentiment class of input data, the model may be trained to handle negation among many other features and characteristics of the input data. Negation training is expected to train the model to correctly predict input sentences in the presence of various negation forms. Table 2 shows examples of various forms of negation.

TABLE 2

| Negation Form | Original Sentence | Negated Sentence |
| --- | --- | --- |
| Negation cues | "I like this product." → positive "I love their service." → positive | "I don't like this product." → negative "I never love their service." → negative |
| Antonym words | "I love their service." → positive "The product design is beautiful." → positive | "I hate their service." → negative "The product design is ugly." → negative |
| Morphological prefixes or suffixes | "I like this product." → positive "Their service is useful." → positive | "I dislike this product." → negative "Their service is useless." → negative |

Moreover, to accurately predict the sentiment class of input data without bias, the model may be trained to handle fairness among many other features and characteristics of the input data. Fairness training is expected to train the model to give invariant or fair predictions in the presence of words from different demographic groups. Fair predictions as used herein mean the same predicted labels and/or substantially the same (very small differences) predicted scores for each sentiment class irrespective of the demographic group represented in an example. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. Table 3 shows examples of demographic groups with corresponding invariant sets of sentences.

TABLE 3

| Demographic Group | Demographic Words | Examples | Comment |
|---|---|---|---|
| Race | Asian, Hispanic, Alaska Native Indian, Black, White, . . . | ["A group of Asian business owners challenged Fisher in court.", "A group of Hispanic business owners challenged Fisher in court.", "A group of Alaska Native Indian business owners challenged Fisher in court.", . . . ] | All examples in this group should be labeled as neutral. |
| Sexuality | Transgender, Bisexual, Gay, Lesbian, Straight, . . . | ["He was very kind, helpful with my transgender son.", "He was very kind, helpful with my bisexual son.", "He was very kind, helpful with my gay son.", . . . ] | All examples in this group should be labeled as positive. |
| Religion | Christianity, Roman Catholics, Buddhism, . . . | ["It was created for the defense of Christianity around the world, a task enshrined in its founding charter.", "It was created for the defense of Roman Catholics around the world, a task enshrined in its founding charter.", "It was created for the defense of Buddhism around the world, a task enshrined in its founding charter.", . . . ] | All examples in this group should be labeled as neutral. |
| Nationality | Australian, Japanese, Vietnamese, Mexican, . . . | ["I hate this new Australian car.", "I hate this new Japanese car.", "I hate this new Vietnamese car.", . . . ] | All examples in this group should be labeled as negative. |

In various embodiments, to generate a sentiment analysis model, a model (e.g., a pretrained deep learning model such as BERT) is trained or fine-tuned on a training data set (e.g., training set 445a) of examples with labels across various (e.g., four) sentiment classes. This training data set is named or considered as an original labeled data set (OLDS). To improve the negation and/or fairness handling capabilities of the model, described hereafter are techniques that augment the OLDS with additional labeled and/or unlabeled examples comprising forms of negation, various demographics words, or combinations thereof.

A.1 Negation Pair Data Set (NPDS)

Initially, the OLDS, an unlabeled corpus, or both are searched (e.g., travel, medical, finance, etc.) to identify examples in one or more target domains comprising predefined sentiment clues. The sentiment clues may, for example, comprise:
- negation cues such as "aren't", "didn't", "never", "nothing", "none", . . . ;
- sentiment laden words such as "excellent", "love", "enjoyed", "terrible", "failed", "damaged", . . . ; or
- words with sentiment prefixes or suffixes: "dislike", "useless", . . .

As should be understood, not all examples within a set of examples can be contradicted or negated (i.e., turned from positive to negative or negative to positive), and thus the unlabeled corpus may be used alone or in combination with the OLDS to overcome instances where the OLDS does not have enough examples that can be negated (e.g., only 25 out of 1000 OLDS examples can be contradicted).

Thereafter, in instances where the unlabeled corpus was searched, examples identified in the unlabeled corpus are labeled for at least the correct sentiment class. The labeled examples (all or a subset thereof) from the OLDS, labeled from the unlabeled corpus, or both are then rewritten to create a version of each example that is contradictory to the original sentiment (i.e., turned from positive to negative or negative to positive) by substituting or adding a negation cue, replacing sentiment laden words with an antonym of the sentiment laden word, or adding sentiment prefixes or suffixes, as shown in Table 2. The output of the negation augmentation is a negation pair data set comprising example pairs. Each pair comprises an original example and its contradictory form (i.e., negated version). In some instances, the pair of examples are labeled in order to maintain the association between examples in a pair. Crowd workers, automated techniques, or any combination thereof can be used for implementing the negation augmentation in one or both of steps: rewriting an example to generate the contradictory form of the example or verifying if the generated contradictory form of the example is correct (e.g., grammatically accurate). Advantageously, sentiment clues such as negation cues are used to select examples from target domains that are more likely to be contradicted by simply altering some part of the original example.

A.2 Fairness Invariance Data Set (FIDS)

Initially, one or more demographic groups (e.g., those where there is interest/concern in ensuring the model exhibits fairness) are identified for the fairness training protocol. For each identified demographic group, a list of demographic words associated with the demographic group is generated. The list of demographic words should be as exhaustive as possible. For example, the race group may include: 'hispanic', 'asian', 'middle eastern', 'african american', 'american indian', 'eurasian', 'white', 'black', etc. An unlabeled corpus is then searched (e.g., travel, medical, finance, etc.) to identify examples in one or more target domains comprising at least one demographic word from the list of demographic words generated for each identified demographic groups. The demographic words and groups may, for example, comprise:

Race: Asian, Hispanic, Alaska Native Indian, Black, White, . . .
Sexuality: Transgender, Bisexual, Gay, Lesbian, Straight,
Religion: Christianity, Roman Catholics, Buddhism, . . . ; or
Nationality: Australian, Japanese, Vietnamese, Mexican, . . .

Thereafter, the identified unlabeled examples are rewritten to create one or more versions of each example. Each version of an example includes a demographic word that is different from the original demographic word in the example. The one or more versions are created by substituting the original demographic word with a demographic word from the list of demographics words (or a subset thereof) that is associated with the demographic group from which the original demographic word belongs, as shown in Table 3. The output of the fairness augmentation is a fairness invariance data set comprising groups of one or more versions K of each example. For each group, one example (original example) is from the unlabeled corpus while the rest of K−1 examples are different from the original example by only the demographic word (i.e., each version having a different demographic word from a same demographic group). Crowd workers, automated techniques, or any combination thereof can be used for implementing the fairness augmentation in one or both of steps: rewriting an example to generate the different versions of the example or verifying if the generated different versions of the example are correct (e.g., grammatically accurate). Advantageously, demographic words from demographic groups of interest are used to select examples from target domains that are more likely to result in unintended bias (e.g., underrepresented groups).

B. Weighted Batch Balancing with Interleaved Data Groups

A weighted batch balancing technique can be applied for any machine learning model that is trained using an optimization algorithm (e.g., a stochastic gradient descent algorithm or a variant thereof such as batch gradient descent or minibatch gradient descent) to find the model parameters that correspond to the best fit between predicted and actual outputs. During training, error is calculated as the difference between the actual output and the predicted output. The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training examples. In some machine learning algorithms such as a neural network, this is done using back propagation. The current error is typically propagated backwards to a previous layer, where it is used to modify the weights and bias in such a way that the error is minimized. The weights are modified using the optimization function. Optimization functions usually calculate the error gradient, i.e., the partial derivative of the objective function with respect to weights, and the weights are modified in the opposite direction of the calculated error gradient. This cycle is repeated until the minima of the objective function is reached.

Different objective functions will give different errors for the same prediction, and thus have a considerable effect on the performance of the model. One of the most widely used objective functions is mean square error, which calculates the square of difference between actual value and predicted value. Different objective functions are used to deal with different types of tasks, e.g., regression and classification. In some instances, a first loss function is used for the weighted batch balancing technique (e.g., a first loss function may be defined for negation training). In other instances, a second loss function is used for the weighted batch balancing technique (where the second loss function is different from the first loss function, e.g., the second loss function may be defined for fairness training). In other instances, the first lost function and the second loss function are used in combination for the weighted batch balancing technique (for example, as a cost function).

The first loss function may be cross-entropy loss. Equation (1) is the cross-entropy of input text x:

$$XE(\theta, x, c) = -\sum_i c_i \log[p_i(x, \theta)] \qquad \text{Equation (1)}$$

Where:
θ is the model parameters to be learned,
c is the correct sentiment label vector of text input,
i is the index over the possible sentiment classes (e.g., 4 classes shown in Table 1). Only one $c_i=1$ if i is the correct label sentiment for x while the others $c_i=0$,
$p_i(x, \theta)$ is the model's prediction probability that x belongs to the sentiment i.

The second loss function may be Kullback-Leibler divergence (KL-Divergence). Equation (2) is the KL-Divergence of input text x:

$$KL(InvG_u) = \frac{1}{|InvG_u|} \sum_{\forall x \in InvG_u} KL[p(x), p(y)] = \qquad \text{Equation (2)}$$

$$\frac{1}{|InvG_u|} \sum_{\forall x \in InvG_u} \sum_i p_i(x) \log\left[\frac{p_i(x)}{p_i(y)}\right]$$

Where:
y is the first example in the invariance unlabeled batch,.
$InvG_u$ is a sampling batch from invariance data group u and $|InvG_u|$ is the number of examples in the batch.
x is the utterance or sentence for sentiment prediction.
p( . . . ) is the prediction probabilities of sentiment classes which is introduced in Equation 1.
KL is KL-Divergence.
. Note that the model parameters θ from the prediction probabilities are suppressed to simplify the notation. In certain instances, this loss could be replaced with a more computationally expensive pairwise version, e.g., the average of KL-Divergence of all potential pairs in the batch. Further, the KL-Divergence could be replaced by another distance metric on probability or logit vectors such as L1 or L2 norm.

The model parameters may be updated (as described in detail below) by interleaving and minimizing a weighted combination of the first loss function such as cross entropy over labeled data (i.e., $D_l$) and a second loss function such as KL-divergence over fairness invariance unlabeled data (i.e., $D_u$). Equation (3) is example cost function for the weighted interleaving of input text x:

$$loss(\theta) = \sum_{x \in D_l} XE(\theta, x) + \lambda_{sw} \times \sum_{InvG_u \in D_u} KL(InvG_u) \quad \text{Equation (3)}$$

Where:

$$\sum_{x \in D_l} XE(\theta, x)$$

is the result of first loss function (cross entropy) over labeled data (i.e. $D_l$), $$\sum_{InvG_u \in D_u} KL(InvG_u)$$

is the result of the second loss function (KL-divergence) over fairness invariance unlabeled data (i.e. $D_u$),
$\lambda_{sw}$ is the sampling weight of the invariance data group u.
XE is the cross-entropy function defined in the Equation 1.
KL is the KL-Divergence defined in the Equation 2.

When training the model, each example in the data set may be presented as input to the machine learning algorithm. The performance of the model is evaluated using the objective function over all the training examples. Then the optimization function will update the model parameters based on the objective function. This is repeated for every epoch. An epoch indicates the number of passes of the entire training dataset the machine learning algorithm has completed and is a tunable hyperparameter. However, if the entire training dataset is a huge size (e.g., a million examples), then the training speed of the model will be very slow because a lot of memory in the CPU is being taken up by having to store the error for all the examples which is very inefficient. In order to overcome this problem, batch training was developed to minimize the amount of data that has to be stored by the memory during training of the model.

In batch training, all the training examples are broken into batches (e.g., split 100,000 examples into 10 batches of 10,000 examples each), and each example in a batch is presented as input to the model. The performance of the model is evaluated using the objective function over the training examples in each batch. Then the optimization function will update the model parameters based on the objective function. This is repeated for every batch and epoch. As discussed above, the error gradient is a statistical estimate. The more training examples used in the estimate, the more accurate this estimate will be and the more likely that the weights of the machine learning algorithm will be adjusted in a way that will improve the performance of the model. The improved estimate of the error gradient comes at the cost of having to use the model to make many more predictions and store the error for all the examples before the estimate can be calculated, and in turn, the weights updated. Alternately, using fewer examples results in a less accurate estimate of the error gradient that is highly dependent on the specific training examples used. This may result in a noisy estimate that, in turn, results in noisy updates to the model weights, e.g., many updates with perhaps very different estimates of the error gradient.

The number of training examples used in the estimate of the error gradient is a hyperparameter for the machine learning algorithm called the batch size, or simply the batch. A batch size of 100 means that 100 samples from the training dataset will be used to estimate the error gradient before the model weights are updated. One training epoch means that the machine learning algorithm has made one pass through the entire training dataset, where examples were separated into selected "batch size" groups. However, as described herein there may be multiple training datasets arising from the various augmentation techniques, including: the OLDS, the NPDS, and the FIDS. Thus, a challenge arises as to how to present examples from these various training data sets as input to the model in order to minimize the time and computing resources (memory and power) required for training while also improving the estimate of the error gradient. This is especially challenging in an instance when both negation and fairness augmentation are being implemented with a cost function comprising multiple loss functions (one for each task-negation versus fairness).

In order to overcome these challenges and others, examples from the training data set(s) or data group(s) are batched and fed appropriately to the machine learning algorithm so that the model can learn all linguistic features that are relevant to negation and/or fairness handling capabilities. Each training batch comprises examples from at least one of the training data sets or data groups (OLDS, NPDS, or FIDS), which allows for block learning (examples of a batch are selected from a single training data set) or interleaving among training data sets (examples of a batch are selected from multiple training data sets). Each training set or data group has a different sampling weight. Each batch is sampled from different training sets or data groups with different sampling weights. These sampling weights can be predefined such as uniform over sentiment classes to counter imbalanced training data, or hypertuned for negation and fairness data groups to achieve the best performances on the core test set as well as some negation and fairness test cases.

Batches of Individual Examples:

Batches of individual examples comprise labeled examples from OLDS, NPDS, or a combination thereof (irrespective of pairing or grouping). For these batches, the model parameters may be updated by minimizing a first loss function (or a first loss function of a cost function) such as the cross-entropy loss shown in Equation (1). In some instances, a number of individual examples are randomly selected from the OLDS, NPDS, or a combination thereof to generate the batch with a determined or defined batch size (e.g., 100 examples). In other instances, individual examples are grouped by sentiment labels (e.g., 4 classes) and/or data sources (e.g., OLDS or NPDS) to generate one or more data groups. Examples are then randomly sampled from these data groups with adjusted weights so that on average:

Examples from the classes appear uniformly to counter the over-representative of positive and negative training examples, while Examples from one data set (e.g., NPDS) appear more frequently than another data set (e.g., OLDS) to emphasize the importance of certain examples (e.g., negation examples).

For example, if the goal of batch balancing of individual examples is for:
- the sampling ratios over 4 sentiment classes are $w_i=1$ for all i in {positive, negative, neutral, mixed} and
- the sampling ratios over data sources (OLDS versus NPDS) are 2:1, i.e., $v_j=2$ for j=OLDS and $v_j=1$ for j=NPDS then the individual examples need to be:
- grouped into 4*2 groups and assigned a sampling weight to the group ij as shown in Equation (4), $$SW_{ij} = \frac{w_i * w_j}{\sum_i \sum_j w_i * v_j} \quad \text{Equation (4)}$$

The sampling weights may be normalized so that their sum is equal to 1. This forms a multinomial distribution of K groups, each with a different probability. Consequently, during sampling, a random number is drawn from this distribution to decide from which training set or data group example(s) are to be sampled. When a training set or data group is selected, example(s) can be randomly and exclusively drawn from the training set or data group to form a random training data batch.

Table 4 shows all sampling weights for the above sampling scenario.

TABLE 4

| Group Sampling Weights | OLDS | NPDS | Ratios over Classes |
| --- | --- | --- | --- |
| Positive | 2/12 | 1/12 | 3/12 (1) |
| Negative | 2/12 | 1/12 | 3/12 (1) |
| Neutral | 2/12 | 1/12 | 3/12 (1) |
| Mixed | 2/12 | 1/12 | 3/12 (1) |
| Ratios over Data Sources | 8/12 (2) | 4/12 (1) | 12/12 |

Batches of Paired or Grouped Examples:

Batches of paired or grouped examples comprise examples from OLDS, NPDS, or a combination thereof with labels (e.g., sentiment labels), or examples from FIDS without labels. For these batches, the model parameters may be updated by minimizing a first loss function (or a first loss function of a cost function) such as the cross-entropy loss shown in Equation (1) for labeled examples and/or minimizing a second loss function (or a second loss function of a cost function) such as the KL-divergence loss shown in Equation (2) for unlabeled examples. In the afore-mentioned batches of individual examples, two examples of a negation pair or fairness might appear in very different batches because the samples are individual and not linked to maintain pairs or groups. In the present instance of batches of paired or grouped examples, to help the model learns linguistic features related to negation or fairness better, the negated pairs or fairness groups are maintained by linking the pairs or groups with labels and added to the batches as pairs or groups of examples. Consequently, in each of these batches, one example always goes with the other negated version or all examples from a fairness group go together into a batch (e.g., each batch is a group of examples where the only difference is the selected demographic words).

Table 5 shows an example sequence of training batches to illustrate the concepts.

TABLE 5

| Batch ID | Batch Type | Labeled | Batched Examples | Batch Loss to Minimize |
| --- | --- | --- | --- | --- |
| 1 | Individual | Yes | I don't like this product. → negative<br>Its French dishes are the best in town. → positive<br>... | Cross Entropy |
| 2 | Negated Pairs | Yes | I like this product. → positive<br>I don't like this product. → negative<br>... | Cross Entropy |
| 3 | Fairness Invariance | No | ["I hate this new Australian car.",<br>"I hate this new Japanese car.",<br>"I hate this new Vietnamese car.",<br>...<br>] | KL-Divergence |
| 4 | Individual | Yes | Let me first point out that even this website contains false information. → negative<br>I like this product. → positive<br>... | Cross Entropy |
| ... | ... | ... | ... | ... |

In some instances, each training batch comes exclusively from one of the above training sets or data groups. Each training set or data group has a different sampling weight. Each batch is sampled from different training sets or data groups with different sampling weights. These weights can be:
- predefined such as uniform over sentiment classes to counter imbalanced training data, or
- hypertuned for negation and fairness data groups to achieve the best performances on the core test set as well as some negation and fairness test cases.

When updating the model parameters with the gradient descent algorithm, different loss functions are used for the different batches:
- For the individual and negated pair batch types of labeled examples, the cross-entropy loss may be minimized as discussed above with respect to Equation (1);
- For the fairness invariance batch type of unlabeled examples, the average of KL-Divergence of prediction probabilities of all other examples to the first one in a batch may be minimized as discussed above with respect to Equation (2).

Overall, the model parameters are updated by interleavingly minimizing a weighted combination of the cross entropy over labeled data (i.e. $D_l$) and KL-divergence over fairness invariance unlabeled data (i.e. $D_u$) as discussed above with respect to Equation (3).

With reference back to FIG. 4, in some instances, additional augmentation may be applied to the data assets 445 (with negation and/or fairness augmentation applied) using augmenting subsystem or service 455. For example, Easy Data Augmentation (EDA) techniques may be used for boosting performance on text classification tasks. EDA includes four operations: synonym replacement, ransom insertion, random swap, and random deletion that prevent overfitting and helping train more robust models. Note that in contrast to negation and fairness augmentation, the EDA operations in general: (i) obtain words from the original text, and (ii) incorporate the words within each data asset 445 relative to the original text. For example, synonym replacement operation includes randomly sampling n words from the original sentence (e.g., utterance) that are not stop words, and replacing each of these words with one of its synonyms chosen at random. The random insertion operation includes-n times-finding a random synonym of a random word in the original sentence that is not a stop word and inserting that synonym into a random position in the sentence. The random swap operation includes-n times-randomly choosing two words in the sentence and swapping their positions. The random deletion operation includes randomly removing each word in the sentence with probability p.

The feature engineering 435 includes transforming the data assets 445 (with negation and/or fairness augmentation applied) into feature vectors and/or creating new features using the data assets 445. The feature vectors may include count vectors as features, TF-IDF vectors as features such as word level, n-gram level or character level, word embeddings as features, text/NLP as features, topic models as features, or an combination thereof. Count vector is a matrix notation of the data assets 445 in which every row represents an utterance, every column represents a term from the utterance, and every cell represents the frequency count of a particular term in a utterance. TF-IDF score represents the relative importance of a term in the utterance. A word embedding is a form of representing words and utterances using a dense vector representation. The position of a word within the vector space is learned from text and is based on the words that surround the word when it is used. Text/NLP based features may include word count in the utterance, character count in the utterance, average word density, punctuation count, upper case count, title word count, frequency distribution of part of speech tags (e.g., nouns and verbs), or any combination thereof. Topic modelling is a technique to identify the groups of words (called a topic) from a collection of utterances that contains best information in the collection.

The model training module 440 performs the processes of determining hyperparameters for the models 425 and performing iterative operations of inputting examples from the batches of training data 445a into the models 425 to find a set of model parameters (e.g., weights and/or biases) that minimizes or maximizes an objective function(s) such as loss or error function for the models. The batches of training data 445a may be augmented as described with respect to augmenting subsystem or service 455. The hyperparameters are settings that can be tuned or optimized to control the behavior of the models. Most models explicitly define hyperparameters that control different features of the models such as memory or cost of execution. However, additional hyperparameters may be defined to adapt the models to a specific scenario. For example, regularization weight, strength of weights or biases, the number of hidden units of a model, the learning rate of a model, the convolution kernel width, or the number of kernels, and the like. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the objective function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, and the like are used update the model parameters in such a manner as to minimize or maximize this objective function as described in further detail herein.

Once a set of model parameters are identified, the model 425 has been trained and can be tested or validated using the subset of testing data 445b (testing or validation data set). The testing or validation process includes iterative operations of inputting utterances from the subset of testing data 445b into the model 425 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 445b may be input into the model 425 to obtain output (in this example, one or more recognized entities), and the output is evaluated versus ground truth entities using correlation techniques such as Bland-Altman method and the Spearman's rank correlation coefficients. Further, performance metrics may be calculated in the skill bot invocation stage 410, intent prediction stage 420, and/or the sentiment prediction stage 415 such as the error, accuracy, precision, recall, receiver operating characteristic curve (ROC), etc. In some instances, the metrics may be used to analyze performance of the model 425 for predicting skills or task, intents, sentiment, or classes of tokens.

The model training stage 405 outputs trained models 425 including the task models 462, intent models 465, and/or sentiment models 467. The task models 462 may be used in the skill bot invocation stage 410 to determine a likelihood that an utterance is representative of a task that a particular skill bot is configured to perform 470, the intent models 465 may be used in the intent prediction stage 420 for classifying utterances as one or more intents 475, and the sentiment models 467 may be used in the sentiment prediction stage 415 for classifying utterances with a sentiment 477. In some instances, the skill bot invocation stage 410 and the intent prediction stage 420 may proceed independently in some examples with separate models. For example, trained intent prediction models 465 may be used in the intent prediction stage 420 to predict intents for skill bots without first identifying the skill bots in the skill bot invocation stage 410. Similarly, the task models 462 may be used in the skill bot invocation stage 410 to predict tasks or skill bots to be used for utterances without identifying the intent of the utterances in the intent prediction stage 420. Similarly, the sentiment prediction models 467 may be used in the sentiment prediction stage 415 to predict sentiment 477 of utterances without identifying the intent of the utterances in the intent prediction stage 420 and/or without first identifying the skill bots in the skill bot invocation stage 410.

Alternatively, the skill bot invocation stage 410, the sentiment prediction stage 415, and the intent prediction stage 420 may be conducted sequentially with one stage using the outputs of the other as inputs or one stage being invoked in a particular manner for a specific skill bot based on the outputs of the other. For instance, for a given input data 460, a skill bot invoker can invoke a skill bot through implicit invocation using the skill bot invocation stage 410 and the task models 462. The task models 462 can be trained, using machine learning and/or rules-based training techniques, to determine a likelihood that an utterance is representative of a task that a particular skill bot 470 is configured to perform. Then for an identified or invoked skill bot and an input data 460, the sentiment prediction stage 415 and sentiment prediction models 467 can be used to classify the sentiment of an utterance (e.g., utterance within input data 460). Then for an identified or invoked skill bot and an input data 460, the intent prediction stage 420 and intent prediction models 465 can be used to match a received utterance (e.g., utterance within input data 460) to an intent 475 associated with skill bot. As explained herein, a skill bot can be configured with one or more intents, each intent including at least one example utterance that is associated with the intent and used for training a classifier. In some embodiments, the skill bot invocation stage 410 and the task models 462 used in the master bot system are trained to determine confidence scores for individual skill bots and confidence scores for system intents. Similarly, the intent prediction stage 420 and intent prediction models 465 can be trained to determine a confidence score for each intent associated with the skill bot system. Whereas the classification performed by the skill bot invocation stage 410 and the task models 462 is at the bot level, the classification performed by the intent prediction stage 420 and intent prediction models 465 is at the intent level and therefore finer grained.

Techniques for Data Augmentation and Sentiment Analysis

Figure 5:
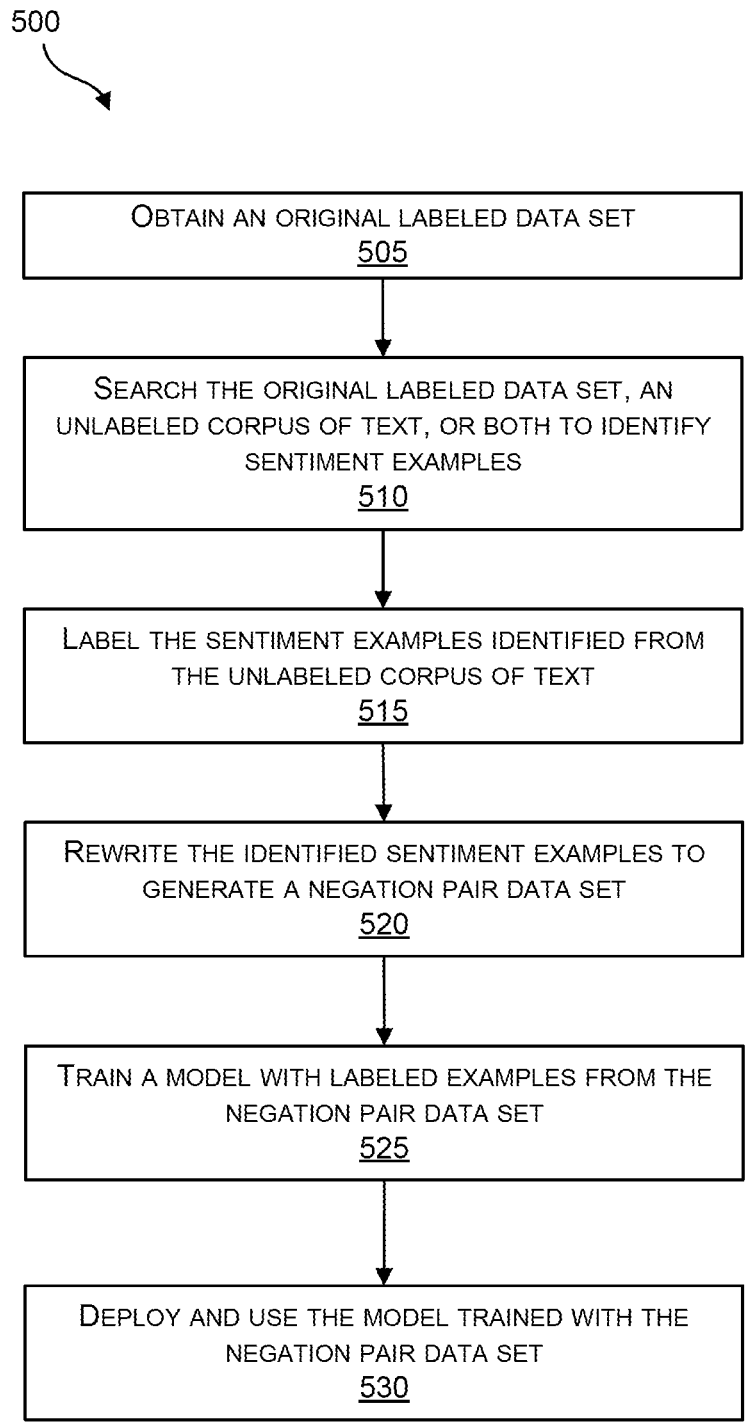
FIG. 5 illustrates a process flow for augmenting a training data set with labeled examples and training a machine learning model using the augmented training data set in accordance with various embodiments.

FIG. 5 is a flowchart illustrating a process 500 for augmenting a training data set with labeled examples and training a machine learning model using the augmented training data set according to various embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 5 may be performed by a pre-processing subsystem (e.g., pre-processing subsystem 210 or model training stage 405) to generate augmented data sets for training one or more models (e.g., a sentiment classifier model).

At 505, an original labeled data set is obtained for training a machine learning model to classify sentiment. Each example from the original labeled data set is labeled with at least a sentiment classification (e.g., negative, positive mixed, or neutral sentiment).

At 510, the original labeled data set, an unlabeled corpus of text, or both are searched to identify examples comprising negation cues, sentiment laden words, words with sentiment prefixes or suffixes, or a combination thereof.

At 515, examples identified from the unlabeled corpus of text are labeled with at least the sentiment classification.

At 520, the labeled examples from the original labeled data set, examples from the unlabeled corpus of text, or both are rewritten to create a labeled version of each example that is contradictory to an original sentiment classification and generate a negation pair data set comprising example pairs. Each example pair comprises a labeled example and a labeled contradictory form of the labeled example. The rewriting comprises: substituting or adding a negation cue to the labeled example, replacing a sentiment laden word of the labeled example with an antonym of the sentiment laden word, or adding a sentiment prefix or suffix to the labeled example.

At 525, the machine learning model is trained using the example pairs from the negation pair data set. In some instances, the training comprises: batching the labeled examples from the original labeled data set and the negation pair data set into batches; evaluating, using a first objective function, performance of the machine learning model on the labeled examples in each batch; and updating, using an optimization function, model parameters of the machine learning model based on the evaluating of the performance of the machine learning model.

The batching may comprise grouping the labeled examples into data groups based on sentiment class, data source, or a combination thereof. The data source being the original labeled data set or the negation pair data set. The grouping may further comprise sampling (e.g., randomly sampling) labeled examples for each of the batches from the data groups. For example, labeled examples from the original labeled data set may be grouped into four data groups corresponding to four sentiment classes, labeled examples from the negation pair data set may be grouped into four data groups corresponding to four sentiment classes, and a first batch may be created by randomly sampling examples from the four data groups associated with the original labeled data and/or the four data groups associated with the negation pair data set. Each of the data groups is assigned a sampling weight based on the sentiment class, the data source, or a combination thereof. The first objective function is modified by the sampling weight during the evaluating of the performance of the machine learning model. By weighted sampling over data groups, the model is effectively trained on the weighted combination of objective functions (e.g., first and second objective function). For example, if more examples are sampled from the NPDS, there is a greater focus on optimizing its corresponding cross-entropy objective function; whereas if more examples are sampled from the FIDS, there is a greater focus on optimizing its corresponding invariance KL divergence objective function (hence the sampling weight lambda_sw). As used herein, when an action is "based on" something, this means the action is based at least in part on at least a part of the something.

In some instances, sampling the labeled examples comprises selection of the labeled example and the labeled contradictory form of the labeled example such that each of the example pairs (i.e., negated pairs) is maintained together within a given batch are maintained together within a given batch. The example pairs are maintained by linking labeled examples of the pairs with labels and added to the batches as pairs of labeled examples. Consequently, in these batches, one labeled example always goes with the other negated version into a batch.

In some instances, the process 500 further comprises obtaining a fairness invariance data set comprising groups of unlabeled examples (e.g., obtained using the fairness augmentation techniques disclosed herein). Each group of unlabeled examples comprises one or more versions (e.g., multiple versions) K of each unlabeled example, and a single unlabeled original example is from the unlabeled corpus of text while a remainder of K−1 unlabeled examples are different from the unlabeled original example by only a demographic word. The batching further comprises: grouping the unlabeled examples into data groups based on sentiment class, data source, or a combination thereof, the data source being the fairness invariance data set; and sampling unlabeled examples for each of the batches from the data groups. The evaluating comprises evaluating, using the first objective function, a second objective function, or a combination thereof, the performance of the machine learning model on the labeled examples and the unlabeled examples in each batch. The first objective function may be cross-entropy loss and the second objective function may be Kullback-Leibler divergence.

In some instances, the sampling comprises sampling (e.g., randomly sampling) the single unlabeled original example and the remainder of K−1 unlabeled examples in a group of unlabeled examples such that the unlabeled examples of a group are maintained together within a given batch. For example, as described above a first batch may be created by randomly sampling examples from the four data groups associated with the original labeled data and/or the four data groups associated with the negation pair data set, and a second batch may be created by randomly sampling examples from four data groups associated with the fairness invariance data set. The unlabeled example groups are maintained by linking unlabeled examples of each group with labels and added to the batches as groups of unlabeled examples. Consequently, in these batches, one example always goes with the other versions into a batch.

At 530, the machine learning model is deployed and used as described herein for sentiment analysis of one or more utterances.

Figure 6:
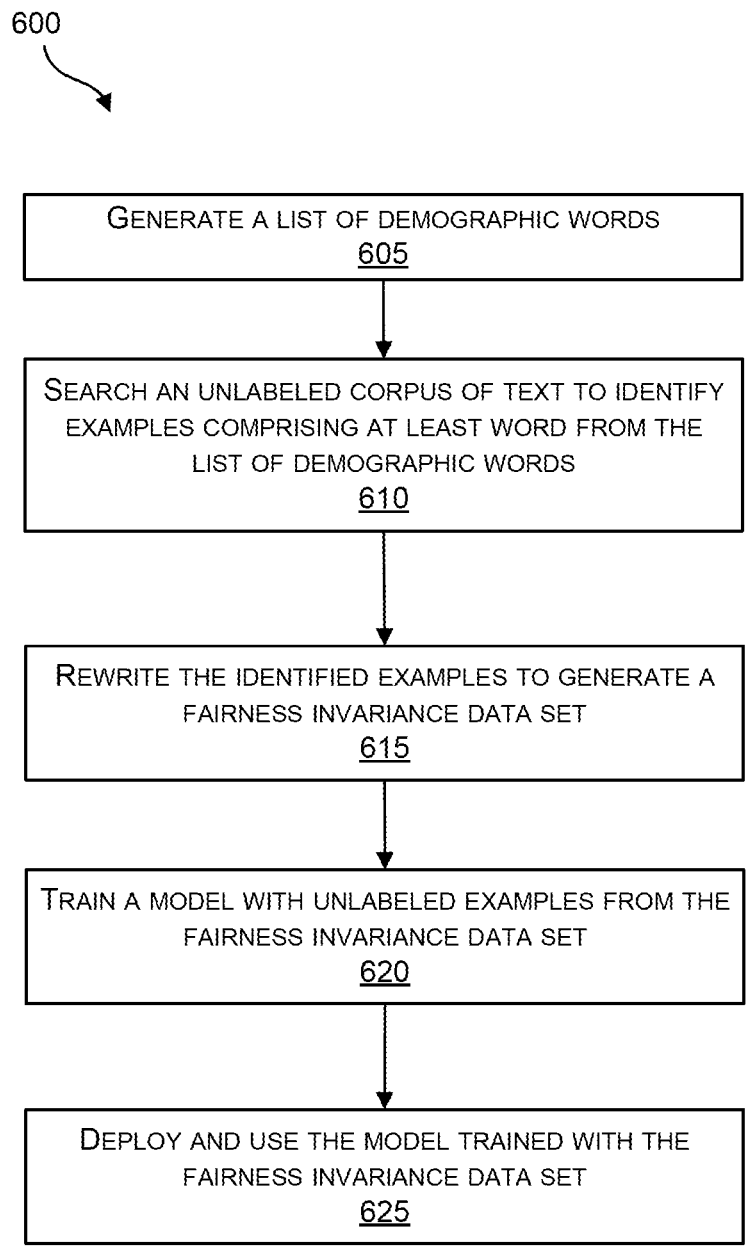
FIG. 6 illustrates a process flow for augmenting a training data set with unlabeled examples and training a machine learning model using the augmented training data set in accordance with various embodiments.

FIG. 6 is a flowchart illustrating a process 600 for augmenting a training data set with unlabeled examples and training a machine learning model using the augmented training data set according to various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 6 may be performed by a pre-processing subsystem (e.g., pre-processing subsystem 210 or model training stage 405) to generate augmented data sets for training one or more models (e.g., a sentiment classifier model).

At 605, a list of demographic words associated with a demographic group is generated. The demographic group may be identified for the fairness training protocol. For example, a developer/user may identify that a machine learning model is prone to biases for one or more demographic words, and therefor decide to train the machine learning model to be invariant to the demographic words within a given demographic group.

At 610, an unlabeled corpus of text is searched to identify unlabeled examples in a target domain comprising at least one demographic word from the list of demographic words.

At 615, the unlabeled examples are rewritten to create one or more versions of each of the unlabeled examples and generate a fairness invariance data set. Each version of an unlabeled example includes a demographic word that is different from an original demographic word in the unlabeled example (i.e., the at least one demographic word from the list of demographic words that was used to identify the unlabeled example from step 610). The one or more versions of each of the unlabeled examples are created by substituting the original demographic word with a demographic word from the list of demographics words or a subset thereof that is associated with the demographic group from which the original demographic word belongs.

At 620, the machine learning model is trained using unlabeled examples (the one or more versions of each of the unlabeled examples from 615 and the unlabeled examples themselves from step 610) from the fairness invariance data set. The training comprises: batching the unlabeled examples from the fairness invariance data set into batches; evaluating, using a first objective function, performance of the machine learning model on the unlabeled examples in each batch; and updating, using an optimization function, model parameters of the machine learning model based on the evaluating of the performance of the machine learning model.

The batching may comprise grouping the unlabeled examples into data groups based on sentiment class, data source, or a combination thereof. The data source being the fairness invariance data set. The grouping may further comprise sampling (e.g., randomly sampling) unlabeled examples for each of the batches from the data groups. For example, unlabeled examples from the fairness invariance data set may be grouped into four data groups corresponding to four sentiment classes, and a first batch may be created by randomly sampling examples from the four data groups associated with the fairness invariance data set. Each of the data groups is assigned a sampling weight based on the sentiment class, the data source, or a combination thereof. The first objective function is modified by the sampling weight during the evaluating of the performance of the machine learning model.

In some instances, the one or more versions of each of the unlabeled examples are multiple versions, and the multiple versions of each of the unlabeled examples and the unlabeled examples are maintained in groups. Each group comprises an unlabeled original example from the unlabeled corpus of text and the multiple versions thereof that are different from the unlabeled original example by a demographic word. The sampling the unlabeled examples comprises selection of the unlabeled original example and the multiple versions thereof such that each group of unlabeled examples is maintained together within a given batch.

In some instances, the process 600 further comprises obtaining a negation pair data set comprising pairs of labeled examples (e.g., obtained using the negation augmentation techniques disclosed herein). The batching further comprises: grouping the labeled examples into data groups based on sentiment class, data source, or a combination thereof, the data source being the negation pair data set; and sampling labeled examples for each of the batches from the data groups. The evaluating further comprises evaluating, using the first objective function, a second objective function, or a combination thereof, the performance of the machine learning model on the labeled examples and the unlabeled examples in each batch. The first objective function may be Kullback-Leibler divergence and the second objective function may be cross-entropy loss.

In some instances, each pair of labeled examples comprises a labeled example and a labeled contradictory form thereof, and the sampling the labeled examples comprises selection of the labeled example and the labeled contradictory form thereof such that each pair of labeled examples is maintained together within a given batch. The example pairs are maintained by linking labeled examples of the pairs with labels and added to the batches as pairs of labeled examples. Consequently, in these batches, one labeled example always goes with the other negated version into a batch.

At 625, the machine learning model is deployed and used as described herein for sentiment analysis of one or more utterances.

Examples

C.1 Results for Weighted Batch Balancing with Negated Pairs Only

Initially, the effectiveness of weighted batch balancing was tested with negated pairs only, i.e. not considering fairness invariance data. Below are models for comparison:

1. Base: a focused BERT model was fine-tuned only on OLDS, i.e. 10 m BERT. The BERT was focused on 10 millions of domain sentences before fine-tuning.
2. WBB: the focused BERT model was fine-tuned on OLDS+NPDS with weighted hierarchical batch balancing for individual examples WITHOUT paired batches. The ratio was 2:1 for examples from OLDS and NPDS, respectively.
3. WBB with Pairs: the focused BERT model was fine-tuned on OLDS+NPDS with weighted hierarchical batch balancing WITH paired batches.

Individual batches: the ratio was 2:1 for examples from OLDS and NPDS, respectively which was similar to (2)

Negated pairs batches: the ratios were 1 for paired batches vs 1/2/3 for individual batches.

For each model, as shown in Table 6 the best accuracy of 5 random runs was reported on overall core tests and negation tests.

The negation augmented models achieved the same performance on the core tests compared to the base 10 m BERT.

However, models with WBB and WBB+Negation Pairs were better than the base one on negation tests.

The best performing model was WBB+Negation Pairs with a ratio of 1:1.

TABLE 6

| Accuracy (Higher is Better) | 10m BERT | 10m BERT + WBB without Pairs | 10m BERT + WBB with Pairs 1:1 | 10m BERT + WBB with Pairs 1:2 | 10m BERT + WBB with Pairs 1:3 |
|---|---|---|---|---|---|
| Core Tests | 94% | 94% | 94% | 94% | 94% |
| Negation Tests | 40% | 48% | 64% | 46% | 58% |

C.2 Weighted Batch Balancing with Negated Pairs and Invariance Groups

The effectiveness of weighted batch balancing was tested with both negation pairs and fairness invariance groups. Below are models for comparison:

1. Base: a focused xtremeDisil BERT was fine-tuned only on OLDS. The xtremeDisil was focused on 10 millions of domain sentences before fine-tuning. This base model was WITHOUT data augmentation and weighted batch balancing.
2. The Methods: a xtremeDisil BERT model was fine-tuned and focused on OLDS+NPDS+FIDS. This model was WITH data augmentation and weighted batch balancing.

For each model, as shown in Table 7 the best accuracy of 5 random runs was reported on overall core tests, negation, and fairness tests.

The model with data augmentation and weighted batch balancing was better on both negation and fairness tests. Its accuracy on the core tests was also slightly improved.

| Accuracy (Higher is Better) | 10m xtremeDistil WITHOUT negation and fairness invariance augmentation | 10m xtremeDistil WITH negation and fairness invariance augmentation |
|---|---|---|
| Core Tests | 90% | 91% |
| Negation Tests | 31% | 49% |
| Fairness Tests | 22% | 84% |

Illustrative Systems

Figure 7:
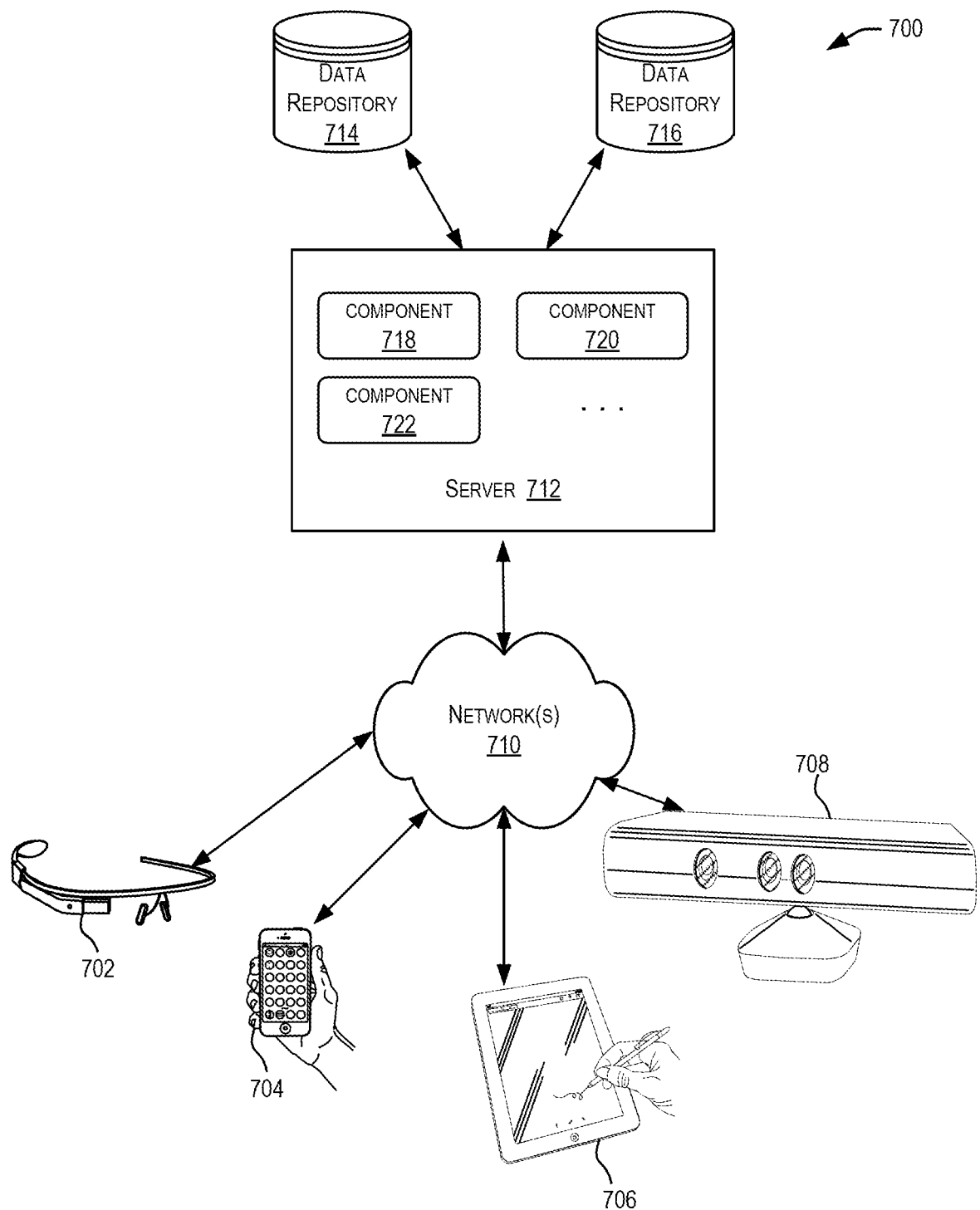
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to chatbot performance or generated models for use by chatbots used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
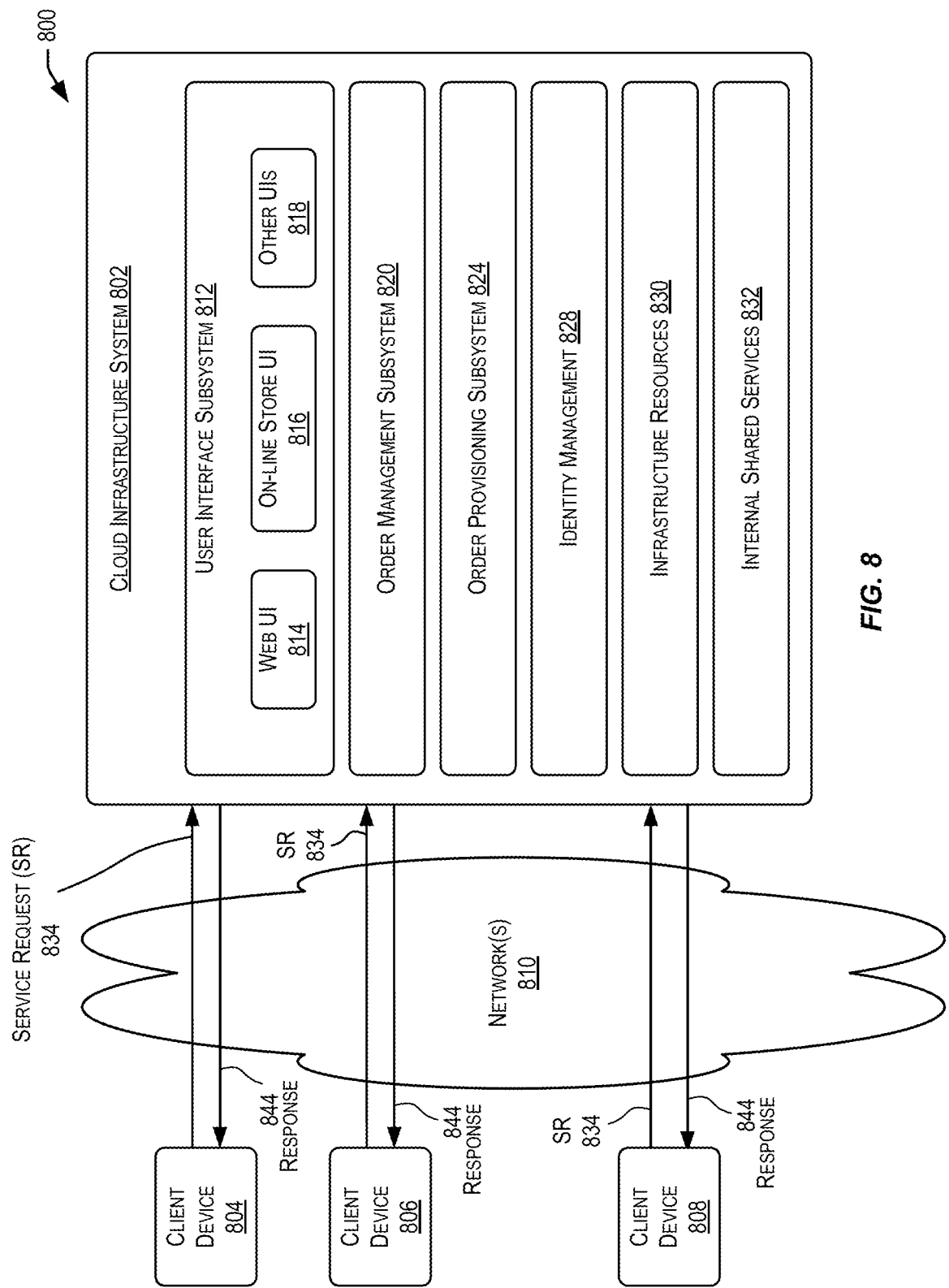
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a chatbot as described in this disclosure.

In some examples, the processing performed by cloud infrastructure system 802 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 802 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to.

The service request may include information identifying the customer and one or more services that the customer desires to subscribe to. For example, a customer may place a subscription order for a service offered by cloud infrastructure system 802. As part of the order, the customer may provide information identifying a chatbot system for which the service is to be provided and optionally one or more credentials for the chatbot system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 802 and information identifying a chatbot system selected by cloud infrastructure system 802 for the chatbot system corresponding to the chatbot system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
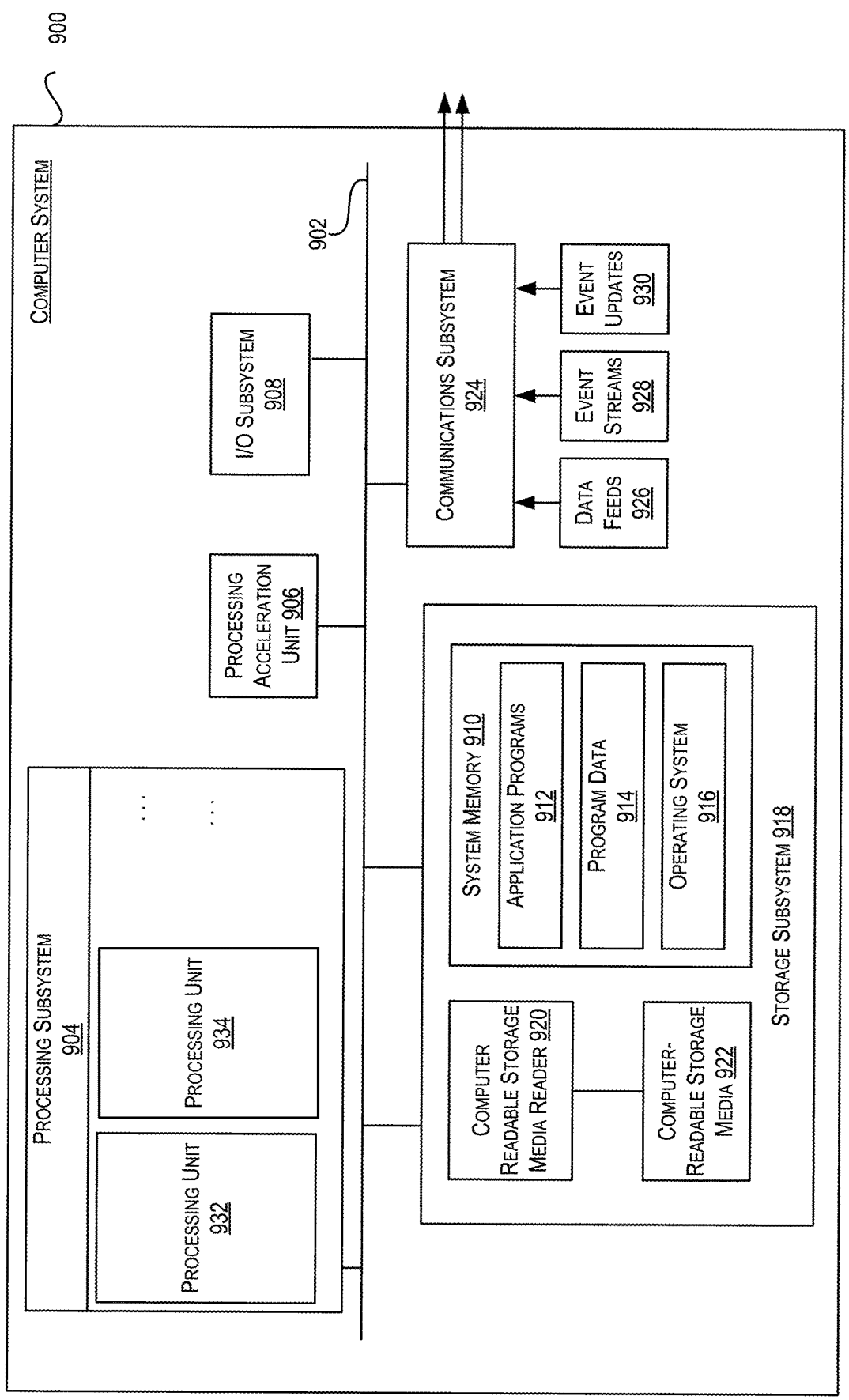
FIG. 9 illustrates an example computer system that may be used to implement various embodiments.

FIG. 9 illustrates an example of computer system 900. In some examples, computer system 900 may be used to implement any of the digital assistant or chatbot systems within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem 904 may be implemented using customized circuits, such as application specific integrated circuits (ASICs), or field programmable gate arrays (FPGAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a chatbot system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
generating a list of demographic words associated with a demographic group;
searching an unlabeled corpus of text to identify unlabeled examples in a target domain comprising at least one demographic word from the list of demographic words;
rewriting the unlabeled examples to create one or more versions of each of the unlabeled examples and generate a fairness invariance data set, wherein each version of an unlabeled example includes a demographic word that is different from an original demographic word in the unlabeled example, and wherein the one or more versions of each of the unlabeled examples are created by substituting the original demographic word with a demographic word from the list of demographics words or a subset thereof that is associated with the demographic group from which the original demographic word belongs; and
training the machine learning model using unlabeled examples from the fairness invariance data set, wherein the training comprises:
batching the unlabeled examples from the fairness invariance data set into batches, the batching comprises:
grouping the unlabeled examples into data groups based on sentiment class, data source, or a combination thereof, the data source being the fairness invariance data set, wherein each of the data groups is assigned a sampling weight based on the sentiment class, the data source, or a combination thereof, and
sampling unlabeled examples for each of the batches from the data groups;
evaluating, using a first objective function, performance of the machine learning model on the unlabeled examples in each batch, wherein the first objective function is modified by the sampling weight during the evaluating, and
updating, using an optimization function, model parameters of the machine learning model based on the evaluating of the performance of the machine learning model.

2. The method of claim 1, wherein:
the one or more versions of each of the unlabeled examples are multiple versions, and the multiple versions of each of the unlabeled examples and the unlabeled examples are maintained in groups;
each group comprises an unlabeled original example from the unlabeled corpus of text and the multiple versions thereof that are different from the unlabeled original example by a demographic word; and
the sampling the unlabeled examples comprises selection of the unlabeled original example and the multiple versions thereof such that each group of unlabeled examples is maintained together within a given batch.

3. The method of claim 1, further comprising obtaining a negation pair data set comprising pairs of labeled examples, wherein the batching further comprises:
grouping the labeled examples into data groups based on sentiment class, data source, or a combination thereof, the data source being the negation pair data set; and
sampling labeled examples for each of the batches from the data groups; and
wherein the evaluating further comprises evaluating, using the first objective function, a second objective function, or a combination thereof, the performance of the machine learning model on the labeled examples and the unlabeled examples in each batch.

4. The method of claim 3, wherein each pair of labeled examples comprises a labeled example and a labeled contradictory form thereof, and the sampling the labeled examples comprises selection of the labeled example and the labeled contradictory form thereof such that each pair of labeled examples is maintained together within a given batch.

5. The method of claim 4, wherein the first objective function is Kullback-Leibler divergence and the second objective function is cross-entropy loss.

6. A system comprising:
one or more data processors; and
one or more non-transitory computer readable media storing instructions which, when executed by the one or more data processors, cause the one or more data processors to perform the following operations:
generating a list of demographic words associated with a demographic group;
searching an unlabeled corpus of text to identify unlabeled examples in a target domain comprising at least one demographic word from the list of demographic words;
rewriting the unlabeled examples to create one or more versions of each of the unlabeled examples and generate a fairness invariance data set, wherein each version of an unlabeled example includes a demographic word that is different from an original demographic word in the unlabeled example, and wherein the one or more versions of each of the unlabeled examples are created by substituting the original demographic word with a demographic word from the list of demographics words or a subset thereof that is associated with the demographic group from which the original demographic word belongs; and
training the machine learning model using unlabeled examples from the fairness invariance data set, wherein the training comprises:
batching the unlabeled examples from the fairness invariance data set into batches, the batching comprises:
grouping the unlabeled examples into data groups based on sentiment class, data source, or a combination thereof, the data source being the fairness invariance data set, wherein each of the data groups is assigned a sampling weight based on the sentiment class, the data source, or a combination thereof, and
sampling unlabeled examples for each of the batches from the data groups;

evaluating, using a first objective function, performance of the machine learning model on the unlabeled examples in each batch, wherein the first objective function is modified by the sampling weight during the evaluating, and updating, using an optimization function, model parameters of the machine learning model based on the evaluating of the performance of the machine learning model.

7. The system of claim 6, wherein:

the one or more versions of each of the unlabeled examples are multiple versions, and the multiple versions of each of the unlabeled examples and the unlabeled examples are maintained in groups;

each group comprises an unlabeled original example from the unlabeled corpus of text and the multiple versions thereof that are different from the unlabeled original example by a demographic word; and the sampling the unlabeled examples comprises selection of the unlabeled original example and the multiple versions thereof such that each group of unlabeled examples is maintained together within a given batch.

8. The system of claim 6, wherein the operations further comprise: obtaining a negation pair data set comprising pairs of labeled examples, wherein the batching further comprises:

grouping the labeled examples into data groups based on sentiment class, data source, or a combination thereof, the data source being the negation pair data set; and sampling labeled examples for each of the batches from the data groups; and wherein the evaluating further comprises evaluating, using the first objective function, a second objective function, or a combination thereof, the performance of the machine learning model on the labeled examples and the unlabeled examples in each batch.

9. The system of claim 8, wherein each pair of labeled examples comprises a labeled example and a labeled contradictory form thereof, and the sampling the labeled examples comprises selection of the labeled example and the labeled contradictory form thereof such that each pair of labeled examples is maintained together within a given batch.

10. The system of claim 9, wherein the first objective function is Kullback-Leibler divergence and the second objective function is cross-entropy loss.

11. A computer-program product tangibly embodied in one or more non-transitory machine-readable media, including instructions configured to cause one or more data processors to perform the following operations:

generating a list of demographic words associated with a demographic group;

searching an unlabeled corpus of text to identify unlabeled examples in a target domain comprising at least one demographic word from the list of demographic words;

rewriting the unlabeled examples to create one or more versions of each of the unlabeled examples and generate a fairness invariance data set, wherein each version of an unlabeled example includes a demographic word that is different from an original demographic word in the unlabeled example, and wherein the one or more versions of each of the unlabeled examples are created by substituting the original demographic word with a demographic word from the list of demographics words or a subset thereof that is associated with the demographic group from which the original demographic word belongs; and training the machine learning model using unlabeled examples from the fairness invariance data set, wherein the training comprises:

batching the unlabeled examples from the fairness invariance data set into batches, the batching comprises:

grouping the unlabeled examples into data groups based on sentiment class, data source, or a combination thereof, the data source being the fairness invariance data set, wherein each of the data groups is assigned a sampling weight based on the sentiment class, the data source, or a combination thereof, and sampling unlabeled examples for each of the batches from the data groups;

evaluating, using a first objective function, performance of the machine learning model on the unlabeled examples in each batch, wherein the first objective function is modified by the sampling weight during the evaluating, and updating, using an optimization function, model parameters of the machine learning model based on the evaluating of the performance of the machine learning model.

12. The computer-program product of claim 11, wherein:

the one or more versions of each of the unlabeled examples are multiple versions, and the multiple versions of each of the unlabeled examples and the unlabeled examples are maintained in groups;

each group comprises an unlabeled original example from the unlabeled corpus of text and the multiple versions thereof that are different from the unlabeled original example by a demographic word; and the sampling the unlabeled examples comprises selection of the unlabeled original example and the multiple versions thereof such that each group of unlabeled examples is maintained together within a given batch.

13. The computer-program product of claim 11, wherein the operations further comprise: obtaining a negation pair data set comprising pairs of labeled examples, wherein the batching further comprises:

grouping the labeled examples into data groups based on sentiment class, data source, or a combination thereof, the data source being the negation pair data set; and sampling labeled examples for each of the batches from the data groups; and wherein the evaluating further comprises evaluating, using the first objective function, a second objective function, or a combination thereof, the performance of the machine learning model on the labeled examples and the unlabeled examples in each batch.

14. The computer-program product of claim 13, wherein each pair of labeled examples comprises a labeled example and a labeled contradictory form thereof, and the sampling the labeled examples comprises selection of the labeled example and the labeled contradictory form thereof such that each pair of labeled examples is maintained together within a given batch.

* * * * *